United States Patent [19]
Idoffsson

[11] 3,896,944
[45] July 29, 1975

[54] APPARATUS FOR TRANSFERRING WASTE MATERIAL FROM REFUSE COLLECTING TRUCKS TO A TRANSPORT VEHICLE

[76] Inventor: Sten Esse Torgild Idoffsson, Kovlinge, S-310 26 Vallberga, Sweden

[22] Filed: Feb. 6, 1974

[21] Appl. No.: 439,881

[30] Foreign Application Priority Data
Feb. 7, 1973 Sweden .............................. 7301659
Dec. 7, 1973 Sweden .............................. 7316559

[52] U.S. Cl. .................... 214/41; 198/87; 198/204; 198/233
[51] Int. Cl. .......................................... B65g 67/08
[58] Field of Search ............ 214/38 R, 41, 44 R, 46, 214/83.26; 198/87, 233, 204

[56] References Cited
UNITED STATES PATENTS

| | | | |
|---|---|---|---|
| 2,646,162 | 7/1953 | Brunsvold ........................ | 214/41 X |
| 2,760,622 | 8/1956 | Magee .............................. | 198/87 X |
| 2,840,041 | 6/1958 | Fleming ........................... | 198/204 X |
| 3,378,152 | 4/1968 | Warner ............................. | 214/46 |
| 3,679,078 | 7/1972 | Wetzel ............................. | 214/38 R X |

*Primary Examiner*—Robert G. Sheridan
*Attorney, Agent, or Firm*—John J. Dennemeyer

[57] ABSTRACT

An apparatus for transferring waste material from collecting trucks to a transporting vehicle comprises a wheeled stand coupled to the vehicle and a conveyor system for the waste material consisting of an outer and an inner conveyor part pivotally connected to each other. Both conveyor parts have an endless floor belt and pivotally mounted side plates. A drive ramp is pivotally mounted to the outer conveyor part. The two conveyor parts may be assembled into a compact trailer by pivoting the side plates on the floor belt, the ramp into the outer conveyor part, and the outer conveyor part over the inner conveyor part.

13 Claims, 11 Drawing Figures

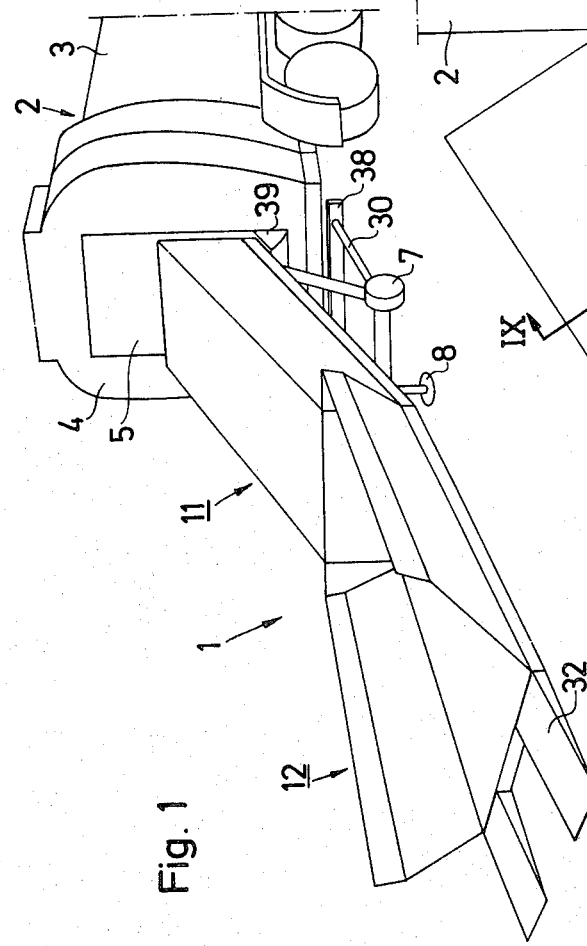
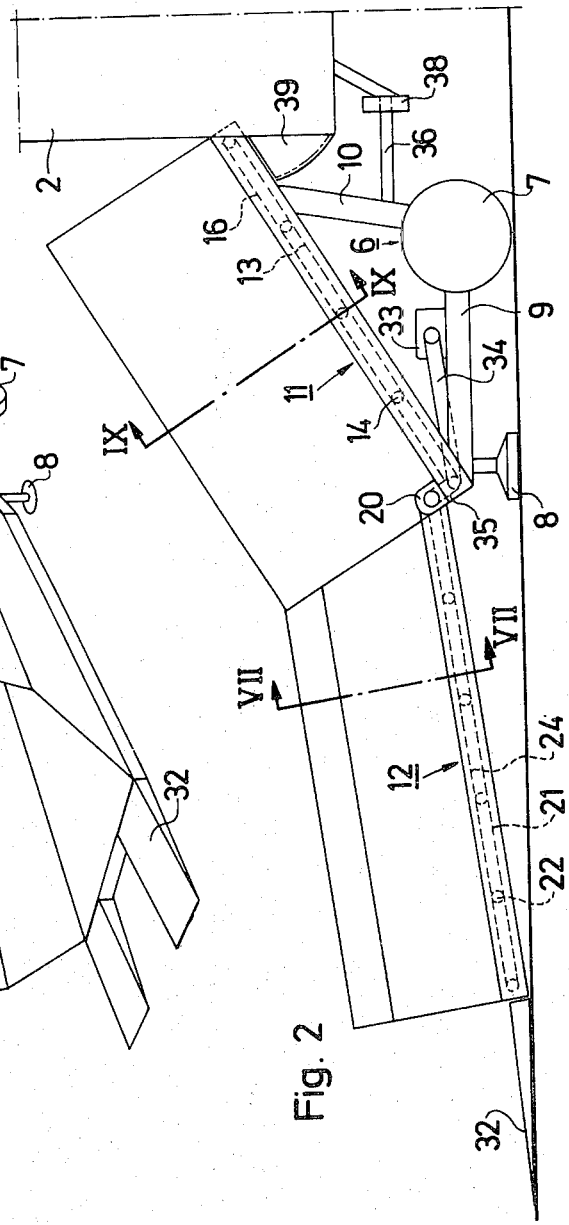

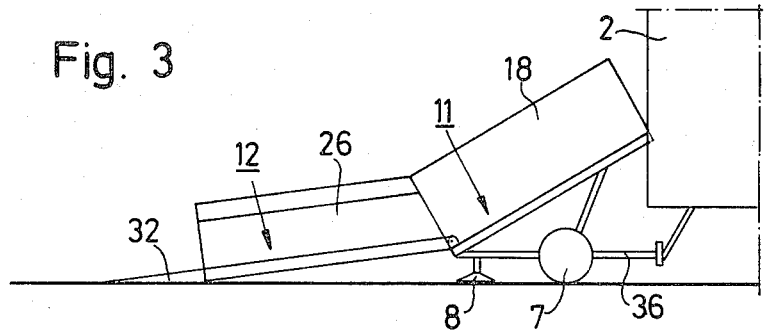
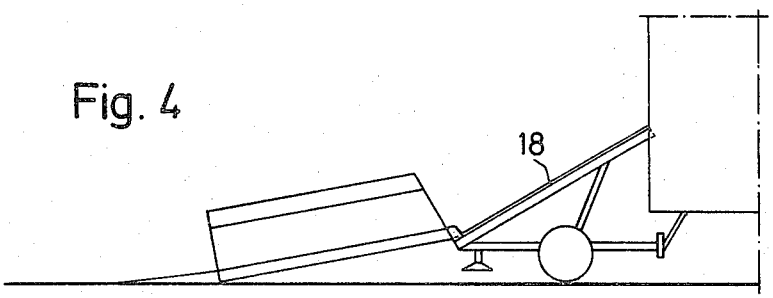
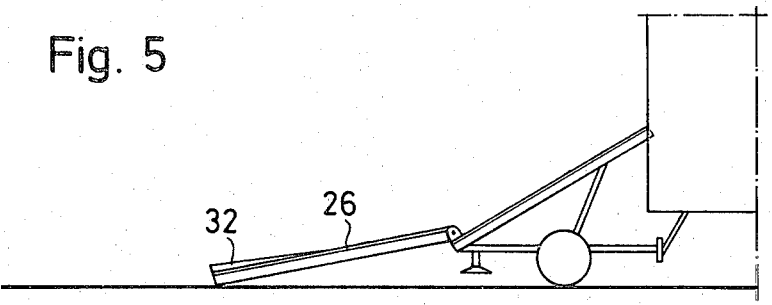
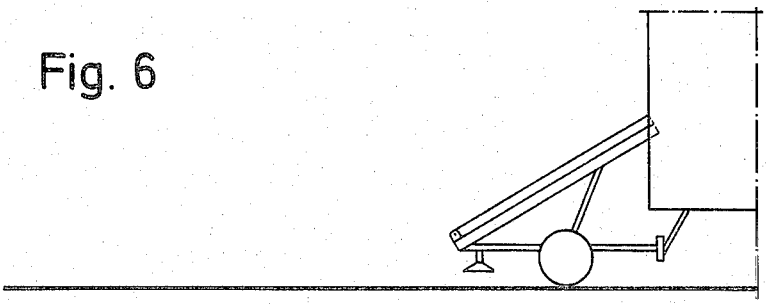

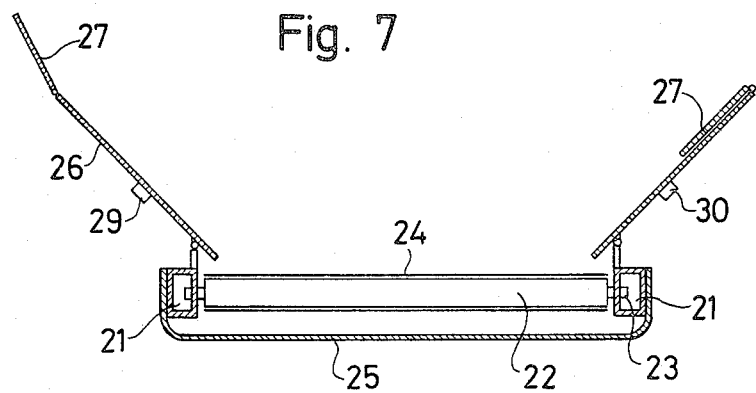
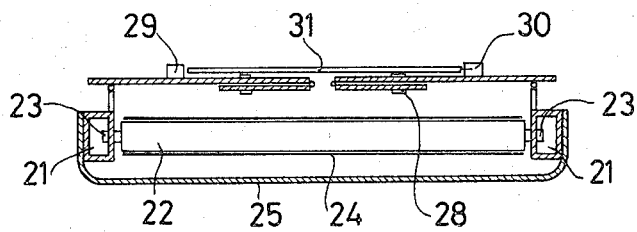
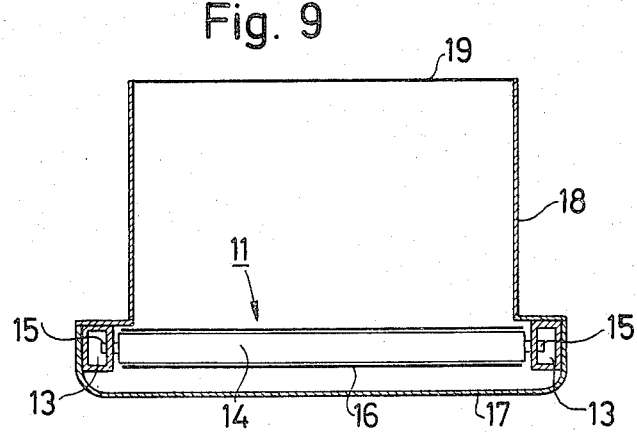

APPARATUS FOR TRANSFERRING WASTE MATERIAL FROM REFUSE COLLECTING TRUCKS TO A TRANSPORT VEHICLE

The present invention relates to an apparatus for transferring waste material from refuse collecting trucks to a transport vehicle having a container for compressing the waste material which is transported by the vehicle to a dumping-ground.

In transporting waste material, collecting the waste with trucks, it is known practice to transport the waste to dumping-grounds. The waste material is emptied into these grounds from the collecting trucks and gradually fed into special transport vehicles provided with containers to compress the waste in order to obtain a great load capacity. These transport vehicles are intended to transport the refuse to dumping-grounds where the final discharge of the material takes place.

Hitherto known collecting plants essentially comprise at least one stationary silo and a driving ramp provided adjacent thereto and designed in such a manner that the refuse collecting trucks may be emptied into the silo. Furthermore the silo is so positioned that the transport vehicles may be driven below the same whereby collected waste material is emptied into the vehicles by gravitational force or by the aid of pressure.

By the use of collecting plants of this type instead of refuse collecting trucks driven directly to the dumping-ground several advantages are obtained. Primarily, the distances driven by the collecting trucks are reduced, resulting in lower costs for the waste handling. Furthermore, highways leading to the dumping-ground are relieved with respect to traffic, the dumping-ground often being situated far from the dense settlement where the waste material is collected.

Previously known collecting plants are expensive to construct and require large building sites usually located outside the dense settlement. Furthermore, these plants must be considered as stationary and it is impossible to move the same, in case of future needs, without extensive building and reconstruction work.

The object of the present invention is to eliminate these drawbacks and provide a plant permitting substantially reduced construction costs in waste handling and which plant may be readily moved when desired. The invention also allows the transfer of waste material in settlements, villages and towns so as to result in a further reduction of the travel distances of the refuse collecting trucks. The apparatus according to the invention occupies an area not exceeding 4 × 20 meters, in other words a very small area in comparison with the area of the building site of presently used silo plants.

According to the invention this is essentially accomplished by an apparatus comprising a stand having at least one coupling member for connecting the stand to the transport vehicle and wheels to permit towing of the stand by the transport vehicle and further provided with a conveyor designed to receive waste material from the refuse collecting trucks and positioned to transport the received waste into the container of the transport vehicle when the stand is connected to the same.

The invention will be further described with reference to the accompanying drawings in which:

FIG. 1 is a perspective view illustrating the transfer apaparatus according to the invention connected to a transport vehicle;

FIG. 2 is a side view showing the connecting position of the transfer apparatus;

FIG. 3 is a side view illustrating the transfer position of the transfer apparatus;

FIGS. 4, 5 and 6 are side views illustrating the transfer apparatus in various folded positions;

FIG. 7 is a section along line VII — VII of FIG. 2;

FIG. 8 illustrates the same section but with folded side plates;

FIG. 9 is a section along line IX — IX of FIG. 2; and

Figure 10:
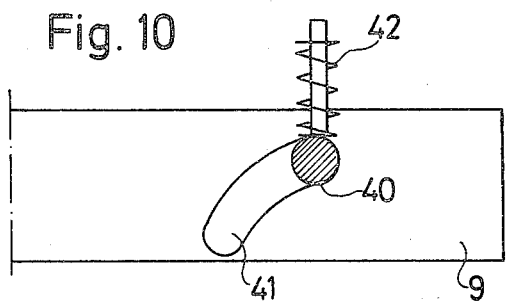
FIG. 10 illustrates the bearing of the shaft assembly of the apparatus.

All the figures are schematically drawn in order to more clearly illustrate the invention since the corresponding construction drawings are very extensive and do not give the same clear impression.

According to the invention the refuse collecting trucks (not shown) are to empty the waste material onto a transfer apparatus 1 to feed the waste products into a transport vehicle 2 for transporting the same to a dumping-ground. The transport vehicle 2 is constructed in a manner known per se to compress the refuse and comprises a rotatable container 3 and a rear face 4 having a feed opening 5. The face portion 4 may be raised by means of a hydraulic device (not shown) to empty the vehicle and has a press worm to grind the received waste material and compress the same.

According to the invention the transfer apparatus is partly constructed to permit tilting of the refuse collecting trucks and dumping of the waste material without spilling, partly constructed to feed the refuse into the opening 5 of the transport vehicle 2 without permitting it to fall on the ground, partly constructed to be folded into a trailer having small dimensions, and partly constructed to enable towing in a folded condition by the transport vehicle 2. To accomplish these objects the transfer apparatus 1 according to an embodiment illustrated in the drawing comprises a stand 6 supported on the ground by wheels 7 and supports 8. The stand 6 comprises frame beams or frame side members 9 extending substantially longitudinally, and frame beams 10 directed obliquely upwardly. A conveying path is provided on these frame beams 9, 10 and comprises two portions 11, 12, pivotally connected to each other. The path portion 11 comprises two parallel beams 13 directly mounted to the frame beams 9, 10 directed obliquely and upwardly. A number of rolls 14 are provided between the beams 13, and are mounted on axial pins 15 which extend into holes in the beams 13. The rolls 14 define bearings for an endless conveyor belt 16 made of an elastic material and preferably provided with projecting ribs, flanges or the like. The ribs (not shown) extend across the belt 16 and preferably have a V-shape with the legs outwardly and upwardly directed. This means that the belt has sufficient grip to feed the waste material upwardly. A plate 17 is positioned below the conveyor belt 16 mounted on the beams 13 and designed to collect refuse dropping from the conveyor belt 16 in order to prevent the refuse from falling to the ground. Furthermore, a lateral plate 18 is pivotally mounted on each beam 13 so that the lower edge thereof is positioned inside the edge of the conveyor belt. In operation the plates 18 are vertically directed and held in this position by means of stays or the like. After releasing the stays (not shown)

the plates 18 may be folded over the conveyor belt when the transfer apparatus 1 is not in use. Furthermore, the plates are provided with bearings along the longitudinal free edges thereof for supporting a cloth 19 made of an elastic material, and the cloth is stretched when the plates are pivoted upwardly and is folded when the plates are shut or pivoted downwardly. This arrangement results in that the waste material is transported in a fully closed shaft and is thereby effectively prevented from falling to the ground. By disposing the lower edge of the plates 18 inside the conveyor belt the waste material is retained on the belt during transport, and agglomeration of waste material above the beams 13 is prevented.

An upwardly extending flange 20 is provided on the lower end of each beam 13, whereby the path portion 12 is pivotally mounted on the flange. The path portion 12 comprises two parallel beams 21, rolls 22 having shaft pins 23 mounted in the beams 21, an endless conveyor belt 24 running over the rolls 22 and a plate 25 mounted on the beams and positioned below the conveyor belt 24 in order to prevent refuse from falling to the ground. Furthermore, the path portion 12 has two side plates 26 pivotally mounted on the beams 21 so that the lower edges thereof are positioned above the conveyor belt 24 to retain the waste material on the same. In operation the plates 26 are obliquely and outwardly-upwardly directed and held in this position by the aid of stays (not shown). The plates 26 are provided with extension plates 27 pivotally mounted along the longitudinal free edges thereof. In operation the extension plates 27 are also directed outwardly-upwardly by means of stays (not shown). The plates 26, 27 define protection plates for waste material being dumped from the refuse collecting trucks and prevent the refuse from falling to the ground outside the conveyor belt 24.

The extension plates 27 are first released to insert the side plates 26, and then folded downwardly and hooked to the plates 26 by means of hook members 28. Thereafter, the plates 26 are folded downwardly so that the side plates do not directly engage the conveyor belt 24. This is accomplished by means of lips 29, 30, provided on the underside of each plate 26, and by means of a stay 31 inserted between the lips so that it grips into at least one of these lips. The dimensions of the stay 31 are so selected that the lips 29, 30 engage the same by the downward folding before the plates engage the conveyor belt 24.

Two drive beams 32 arranged parallel to each other are provided at the free ends of the beams 21 and designed to permit upward driving of the rear wheels of the refuse collecting truck. The drive beams 32 are pivotally mounted and may be folded over the conveyor path 12 and retained in the folded position of the beams 21 by means of hook elements (not shown).

The conveyor belts for the path portions 11, 12 are driven by means of a motor 33 mounted stationary on the frame beam 9 of the stand. Preferably, the operating effect of the motor 33 is transmitted by a variator coupling (not shown) and transferred further via a belt transmission 34 to one of the end rolls 14 of the path portion 11. By means of another belt transmission 35 this end roll is connected to an end roll 22 of the other path portion 12, resulting in the simultaneous driving of the conveyor belts by the motor 33. Furthermore, the transmission is so constructed that the conveyor belt 16 of the path portion 11 is driven to run faster, preferably approximately ten times faster, than the conveyor belt 24 of the path portion 12 to obtain feeding of the waste material at the required efficiency. The driving rate is varied by manual adjustment of the variator. The variator together with the rest of the transmissions are constructed in a known manner and thus a more detailed description is not needed.

A transfer apparatus 1 according to the invention is connected to the transport vehicle 2 and thus the frame beam 10 of the stand 6 is provided with two arms 36 extending forwardly and provided with connecting elements (not shown) at the outer end thereof. The connecting elements are designed to extend into recesses provided in the chassis beams of the transport vehicle and are locked to these automatically or manually. In the embodiment shown the transport vehicle 2 is provided with a bumper for preventing a vehicle from driving under it and comprises downwardly directed beams 37 holding a transverse beam 38 in position below the vehicle. The recesses are provided in the beam 38 and the connecting elements grip behind the beam in such a manner that inner locking parts of these overlap the edges of the recesses. The construction of such a coupling is generally known and therefore not further described.

To facilitate the connection of the transfer apparatus 1 to the transport vehicle 2 it is provided with two arms (not shown) extending backwardly. The arms are mounted to guide the stand 6 when the transport vehicle 2 is backed up toward the stand, so that the connecting elements align with the recesses in the chassis beam or the beam 38 on the bumper for preventing another vehicle from driving under it. The guiding of the stand is permitted by pivot mounting of the wheels 7 whereby they may be turned so that the stand may be moved sideways. To allow the feeding of the waste material through the opening 5 withoug feeding the material too far into the feeding section of the transport vehicle 2 it is provided with a rearwardly extending plate 39 defining a tub open at the top and toward the opening 5. Furthermore, the stand 6 and/or the stay 36 are so dimensioned that the conveyor belt 16 runs over the edge of the plate 39 when the connecting elements of the stand 6 are correctly connected too the transport vehicle 2. As a result, the waste material is fed far enough to be guided into the feeding section of the vehicle but not so far that the material escapes the feeding process performed therein.

The transferring apparatus 1 is designed to take the load off the wheels 7 during the transfer of the waste material and the load is transmitted to the chassis beams of the transport vehicle 2 and to the supports 8. For this reason the shaft assembly 40 of the wheels 7 is displaceably mounted in a groove 41 in the frame beam 9 of the stand. The groove 41 has an arcuate shape and the end parts thereof are positioned on different levels in the frame beam 9 of the chassis. Simultaneously, the shaft assembly 40 is biased by means of a helical spring 42 so provided and dimensioned as to maintain the shaft assembly 40 in the lower part of the groove when the transfer apparatus is not loaded. Furthermore, the helical spring 42 is so arranged that the shaft assembly 40 is displaced upwardly in the groove and is positioned in the top part therof when the transfer apparatus 1 is being loaded. This is accomplished by forming the drive-up beams 32 in two parts, angularly positioned and pivotally connected to each other, and by inserting a sensing device between these parts. The sensing device is actuated if the parts are pressed in a direction toward each other when the refuse collecting truck moves onto the drive-up beams 32. The impulse produced in the sensing device to change the load on the drive-up beams is transmitted to an adjusting device (not shown) on the stand by a mechanical transmission means (eventually by means of an electrical impulse) and this permits the shaft assembly to be displaced upwardly in the groove 41 so that the front of the stand 6 rests on the chassis of the transport vehicle 2 and the rear part thereof rests on the supports 8. The sensing device is further provided to indicate when the wheels of the refuse collecting truck leave the drive-up beams 32 and thereby guides the adjusting device on the stand 6 to reposition the shaft bridge 40 to the lowermost part of the groove 41. In other words, this arrangement avoids loads on the wheels 7 during refuse transport but permits the wheels 7 to automatically go back to the drive position when the refuse collecting truck has moved down from the drive-up beams 32.

When the transfer apparatus 1 is to be transported to another site by means of the transport vehicle 2 it is converted into a trailer of small length as illustrated in FIGS. 3 - 6. This is accomplished by downwardly folding the side plates of the path portions 11, 12 and fixing the same in the disclosed manner, thereafter folding the drive-up beams 32 over the path portion 12 and fixing the same thereto, and finally upwardly folding the path portion 12 over the path portion 11 and locking the same. By the upward folding of the path portion 12 preferably the stay 31 engages stationary thills (not shown) fixed to the path portion 11 so that the stay 31 and the plates 26, 27 are held in position.

Accordingly the transfer apparatus of the invention permits a rapid transfer of the waste material from the refuse collecting trucks to a transport vehicle, whereby the transfer may be accomplished without the risk of dropping any refuse. Furthermore, by means of simple movements by hand the apparatus may be converted into a trailer to be towed by the transport behicle and mounted for transfer practically anywhere.

In the embodiment shown above certain details have not been described since their shape and function is obvious to the person skilled in the art. However, in respect of the path portions 11, 12 it may be mentioned that the conveyor belt 24 runs somewhat over the conveyor belt 24 and the plates 25, 27 of the path portions engage each other closely when the path portions 11, 12 are in the operating condition so that waste material connot drop therebetween.

Figure 11:
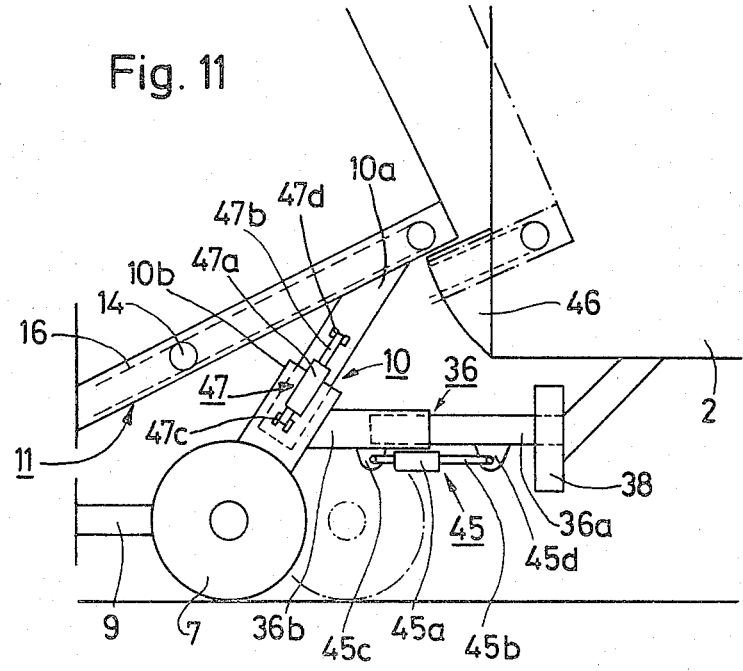
FIG. 11 is a side view illustrating the length control apparatus.

FIG. 11 shows a length control apparatus, in which, according to the invention, the arm 10 comprises two (or more) arm portions 36a and 36b, of which the arm portion 36a is inserted in the arm portion 36b and mounted to be displaced relative to the arm portion 36b, which means that the overall length of the arm 36 can be varied. For displacement of the arm portion 36a a power unit 45 is provided comprising a cylinder 45a which is connected to the arm portion 36b via carriers 45c, and a piston 45b which is inserted in the cylinder and connected to the arm portion 36a via carrier 45d. The power unit 45 is connected via conduits (not shown) to a pneumatic or hydraulic system in the transport vehicle 2. As an alternative construction to the length control apparatus just described, more than two arms can be displaceably mounted relative to each other, either by telescope design or in any other suitable way. The power unit 45 can be designed in other ways than the one just described.

The length of the arm 36 shown in the drawing is so positioned that the path portion 11 extends up and over a waste receiver 46, which corresponds with the plate 39 in FIGS. 1 and 2. The waste receiver 46 is preferably either detachably or pivotally mounted on the transport vehicle 2. The feeding position of the transfer apparatus is shown with continuous lines in the drawing.

When the transfer apparatus is to be towed by the transport vehicle 2, the overall length of the arm 36 is shortened by inserting the arm portion 36a more into the arm portion 36b. This is of course done by the power unit 45, and preferably after the receiver has been removed or swung away. The front portion of the transfer apparatus is then inserted into the rearwardly placed opening in the transport vehicle 2, whereby the overall length of the transport vehicle 2 including the transfer apparatus is reduced.

Depending on the shape of the transport vehicle 2, it will in some cases be desirable also to change the grade of the path portion 11. This may be accomplished since the frame beam 10 consists of two portions 10a and 10b, which are telescopically displaceable relative to each other through a power unit 47. The power unit 47 comprises a cylinder 47a which is connected to the frame portion 10b via carriers 47c, and a piston 47b which is inserted in the cylinder and which is connected to the frame portion 10a via carriers 47d. The power unit 47 is connected via conduits (not shown) to a pneumatic or hydraulic system in the transport vehicle 2.

The length control apparatus allows the use of the transfer apparatus for feeding industrial and household waste, since the transfer apparatus can be placed within an industrial area or be transported between different municipalities for handling the household waste.

In feeding voluminous industrial waste, the transfer apparatus can be adjusted by the length control apparatus, so that the end of the path portion 11 is located outside the rear opening of the transport vehicle 2 and in feeding less voluminius household waste, the transfer apparatus can be adjusted so that the end of the path portion 11 is located near or inside the rear opening of the transport vehicle 2.

The invention is not limited to the disclosed embodiments but may be varied within the scope of the following claims. As an alternative embodiment the shaft for the path portion 11 may be extended forwardly by means of a hood to be connected to the transport vehicle during refuse transfer. The coupling device to connect the stand 6 to the transport vehicle may be constructed as a conventional coupling for a trailer. Furthermore, the motor 33 may be automatically started when a frictional brake releases the variable coupling to rotate when the drive-up beams are being loaded.

What is claimed is:

1. Apparatus for transferring waste material from refuse collecting trucks to a transport vehicle having a container for compressing the waste material and for transporting the waste material to a dumping-ground, said apparatus comprising a conveyor for transferring the waste material from the refuse collecting trucks into the container of the transport vehicle, said conveyor having:

A. a first conveyor section mounted on a wheeled stand and connectable to the transport vehicle, said first conveyor section having:
 1. a first motor driven endless conveyor element, and
 2. two substantially vertical side walls pivotably connected to fixed structure of the first conveyor section so as to be foldable over said first conveyor element.
B. a second conveyor section pivotably mounted to the first conveyor section and having:
 1. a second motor driven endless conveyor element, and
 2. two substantially upwardly and outwardly directed side walls pivotably connected to fixed structure of the second conveyor section so as to be foldable over said second conveyor element, said second conveyor section with its side walls folded over the second conveyor element being also foldable over said first conveyor section so as to form a small trailer towable by the transport vehicle.

2. Apparatus according to claim 1, wherein the first and second conveyor elements are endless belts driven by a common drive motor, said first conveyor belt being driven substantially faster than said second conveyor belt.

3. Apparatus according to claim 1, wherein drive-up beams which permit climbing of the refuse collecting trucks are pivotably mounted on the second conveyor section and are foldable over the second conveyor element.

4. Apparatus according to claim 1, wherein the free ends of the pivotably connected side walls of the first conveyor section are connected to an elastic cloth defining together with the side walls and the first conveyor element an enclosed conveyor channel, wherein protection plates are pivotably mounted on the upper free ends of the side walls of the second conveyor section, said protection plates resting against the side walls in their folded position and serving in their unfolded position to prevent waste material unloaded from a waste collecting truck from falling to the ground, and wherein bottom plates are provided below the first and second conveyor elements to prevent also conveyed waste material from falling to the ground.

5. Apparatus according to claim 1, wherein the side walls of the second conveyor section are provided with lips mounted to define retaining flanges for a stay which serves to prevent said side plates in their folded position from engaging the second conveyor element.

6. Apparatus according to claim 1, wherein the wheeled stand of the first conveyor section has a ground engaging support and a shaft carrying a wheel at each of its ends, said shaft being adjustable between a lower non-operative position and an upper operative position when there is a load on said conveyor so as to unload the wheels and to transmit the load to the ground through the ground engaging support and to the transport vehicle by means of at least one coupling member.

7. Apparatus according to claim 6, wherein the shaft is movable into said upper position in response to a pressure exerted on the drive-up beams by a refuse collecting truck.

8. Apparatus according to claim 6, wherein said transport vehicle is provided with rearwardly extending stays and that the wheels are so mounted on the stand that said stand may be guided sideways by means of the stays so that the coupling moves into the correct position in relation to the transport vehicle when said vehicle reverses toward the stand.

9. Apparatus according to claim 6, wherein said transport vehicle has a bumper preventing other vehicles from driving beneath it and a transverse beam of said bumper is provided with recesses which receive said coupling.

10. Apparatus according to claim 6, wherein the coupling comprises an arm, which consists of at least two separate portions, which are arranged to be displaced relative to each other by at least one power unit so that the overall length of the arm can be varied.

11. Apparatus according to claim 10, wherein one portion of the arm is designed to be telescopically inserted in the other portion of the arm, and that the power unit consists of a cylinder with a piston and the cylinder is mounted on one portion of the arm and the piston is mounted on the other portion of the arm.

12. Apparatus according to claim 1, wherein said transport vehicle is provided with a plate below a feeding opening to define a tub outside the feeding section of the vehicle and that said conveyor extends upwardly and ends above said tub.

13. Apparatus according to claim 1, wherein the stand includes at least one upwardly directed frame beam, and the frame beam includes at least two separate portions which are arranged to be displaced relative to each other by at least one power unit so that the overall length of the frame beam can be varied for controlling the grade.

* * * * *